(12) United States Patent
Bender

(10) Patent No.: US 8,676,845 B2
(45) Date of Patent: Mar. 18, 2014

(54) DATABASE ENTITLEMENT

(75) Inventor: Michael Bender, Rye Brook, NY (US)

(73) Assignee: International Business Machines Corporation, Armonk, NY (US)

( * ) Notice: Subject to any disclaimer, the term of this patent is extended or adjusted under 35 U.S.C. 154(b) by 1368 days.

(21) Appl. No.: 11/508,567

(22) Filed: Aug. 22, 2006

(65) Prior Publication Data

US 2008/0052291 A1 Feb. 28, 2008

(51) Int. Cl.
*G06F 17/30* (2006.01)

(52) U.S. Cl.
USPC .................................................. 707/785

(58) Field of Classification Search
USPC ........... 707/3, 9, 999.003, 999.009, 781, 785, 707/788
See application file for complete search history.

(56) References Cited

U.S. PATENT DOCUMENTS

| | | | |
|---|---|---|---|
| 5,751,949 A * | 5/1998 | Thomson et al. | 726/4 |
| 6,134,549 A * | 10/2000 | Regnier et al. | 707/9 |
| 6,438,549 B1 * | 8/2002 | Aldred et al. | 707/9 |
| 6,587,854 B1 | 7/2003 | Guthrie et al. | |
| 6,606,627 B1 | 8/2003 | Guthrie et al. | |
| 6,768,985 B1 | 7/2004 | Plasek et al. | |
| 7,216,126 B2 * | 5/2007 | Choy | 707/9 |
| 2004/0044655 A1 * | 3/2004 | Cotner et al. | 707/3 |
| 2004/0266533 A1 * | 12/2004 | Gentles et al. | 463/42 |
| 2005/0177570 A1 * | 8/2005 | Dutta et al. | 707/9 |
| 2006/0136479 A1 * | 6/2006 | Fan et al. | 707/102 |

* cited by examiner

*Primary Examiner* — Jorge A Casanova
(74) *Attorney, Agent, or Firm* — Yudell Isidore Ng Russell PLLC

(57) ABSTRACT

A method, system and computer-readable medium for controlling access to a relational database is presented. The method includes: defining and creating a plurality of entitlement tables, wherein the entitlement tables are usable by multiple relational databases; receiving a request, from a user, for access to requested data in a relational database, wherein the user is identified by a user identifier that is set by a relational database program; and determining if the user is authorized to access the requested data by comparing the user identifier with an entry in an entitlement table that is associated with the requested data in the relational database, wherein the entitlement table defines which data classifications are authorized to be accessed by the user. The plurality of entitlement tables may have a priority hierarchy, wherein the priority hierarchy defines a higher priority entitlement table as being dominant to a lower priority entitlement table.

20 Claims, 17 Drawing Sheets

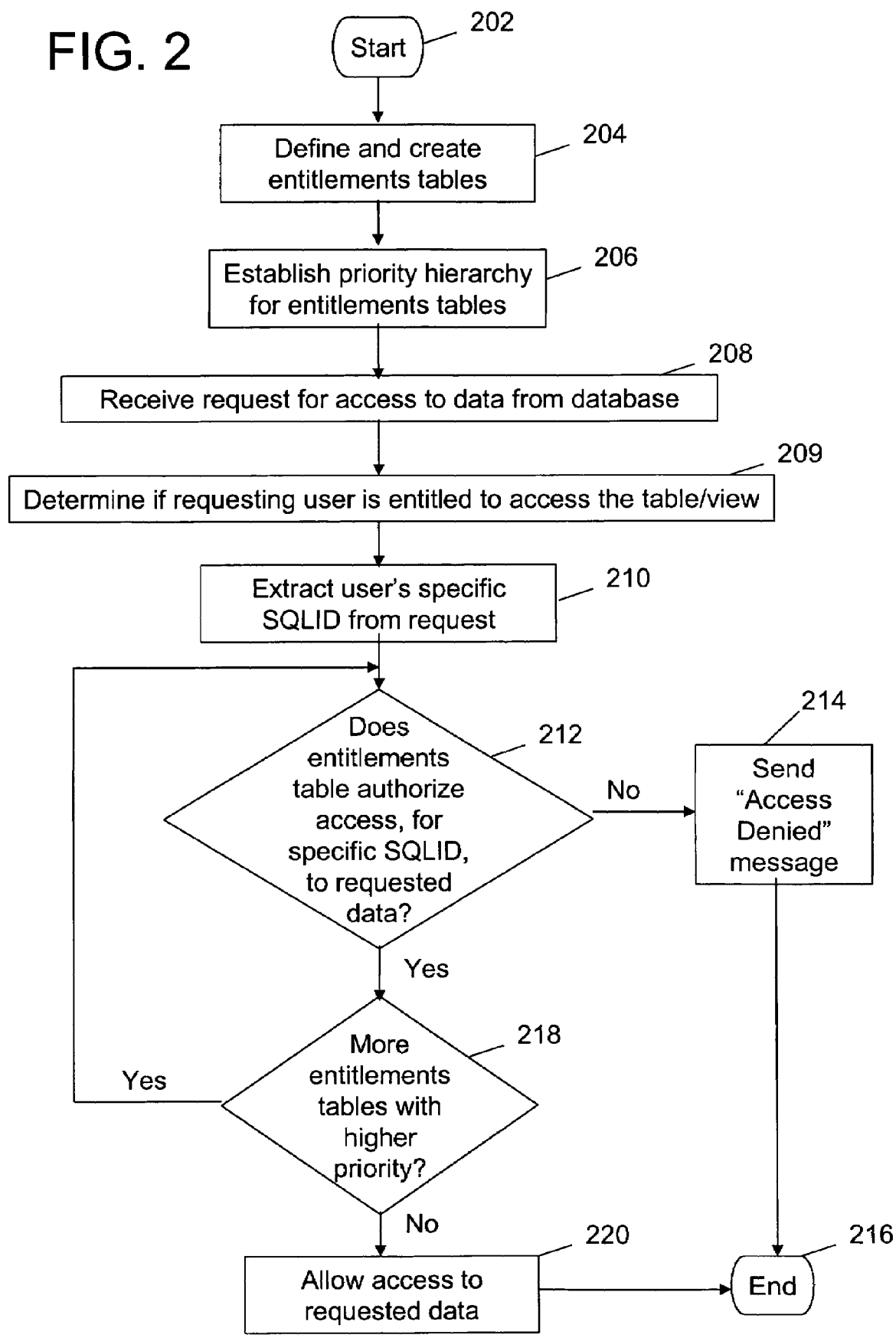

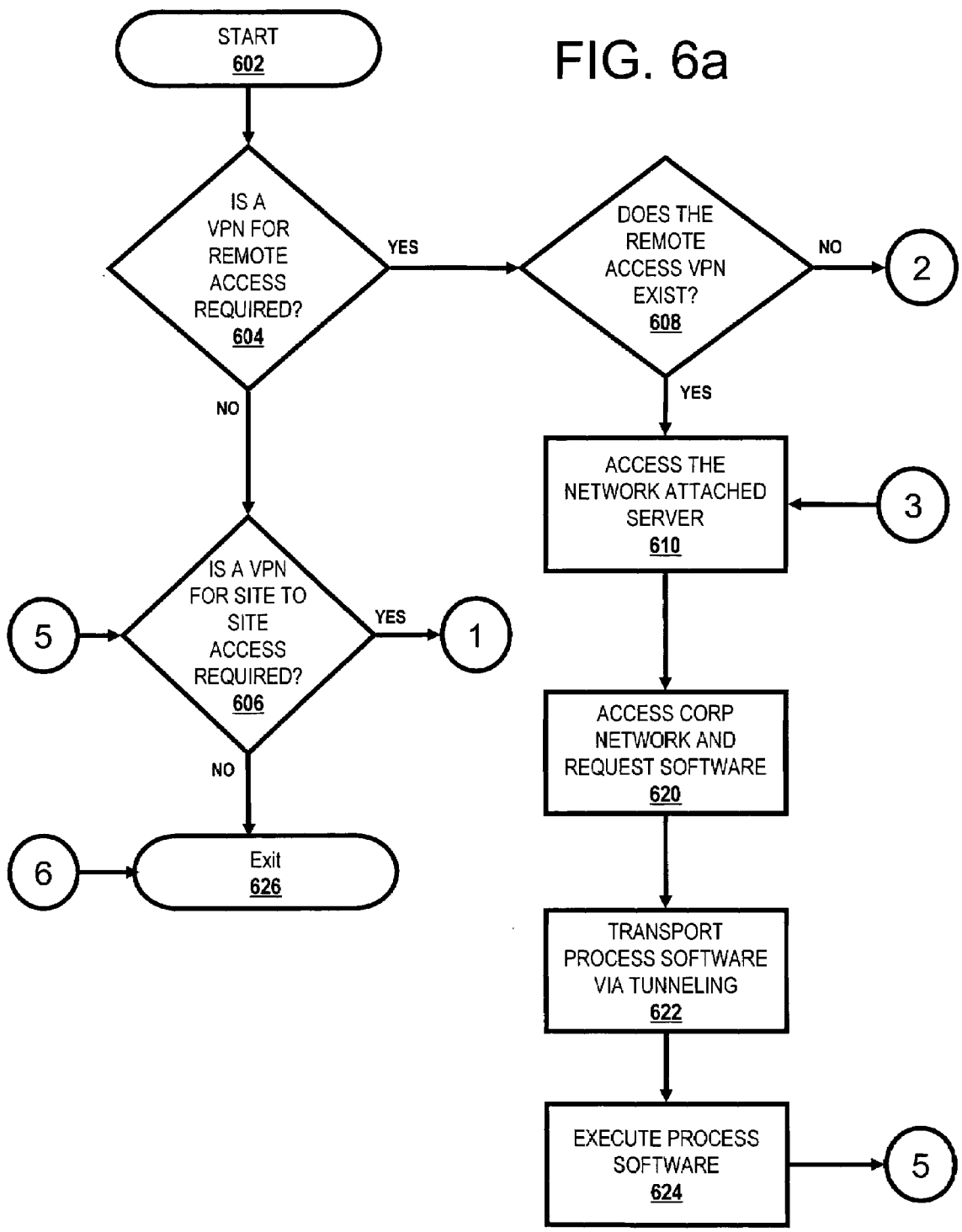

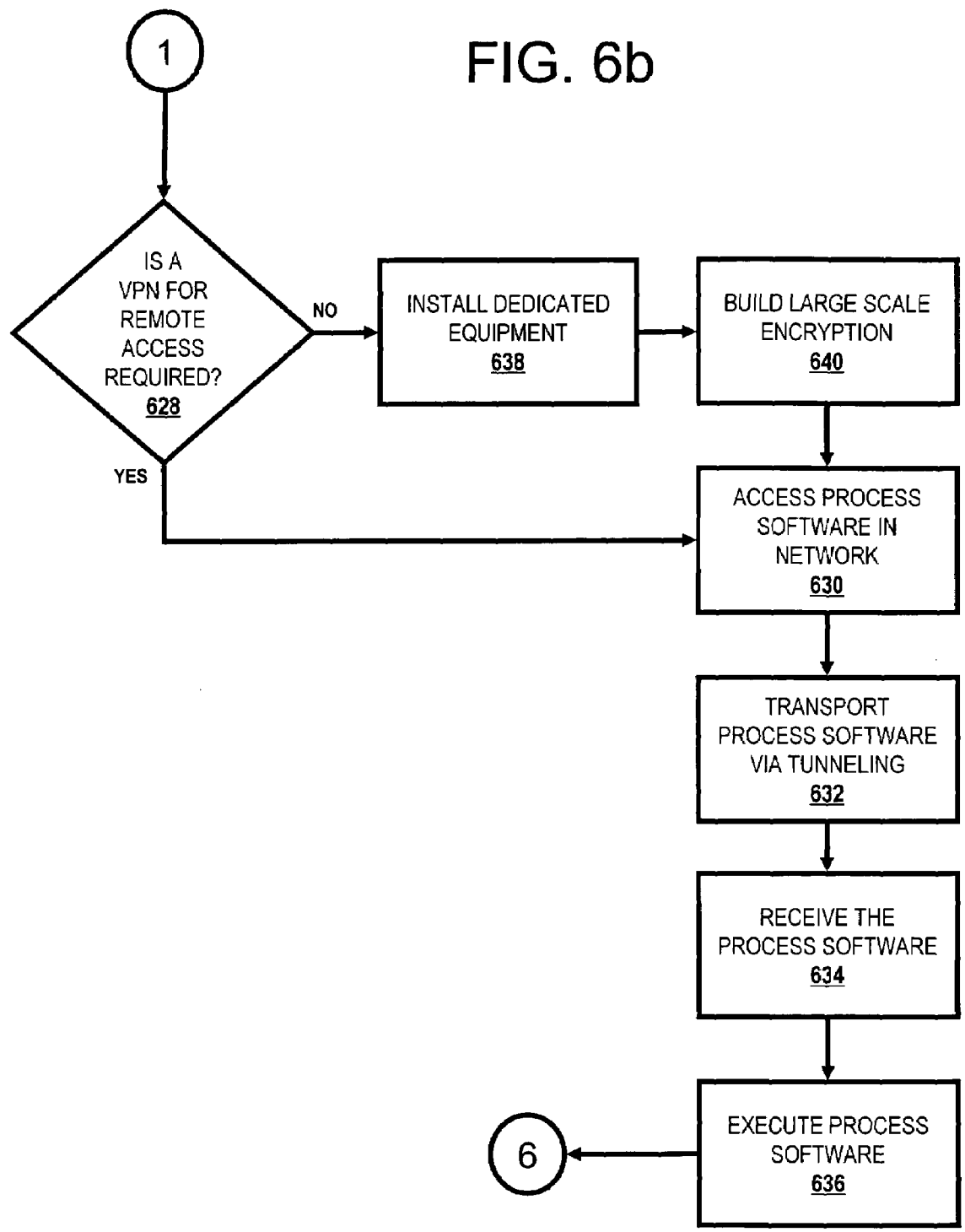

DATABASE ENTITLEMENT

BACKGROUND OF THE INVENTION

1. Technical Field

The present invention relates in general to the field of computers, and more particularly to relational databases. Still more particularly, the present invention relates to controlling access to a relational database through the use of reusable entitlement tables.

2. Description of the Related Art

In the database management arena, entitlements ("authorized access to") to data are built into a database management system are at the table level (or view). That is, each table in a relational database must have its own set of rules for entitlement, thus requiring a new set of rules for each table that must be built into complex views. This condition is cumbersome, since the rules of entitlement are not scalable and have to be rebuilt for every table. (For purposes of the present disclosure, the term "table" will be used to describe a view of structured data in a relational database.)

SUMMARY OF THE INVENTION

The present invention recognizes the need for a scalable entitlement system for rows of data in a relational database table. To provide a new and useful solution to this need, a method, system and computer-readable medium are presented that utilize a scalable entitlement table. The method includes the steps of: defining and creating a plurality of entitlement tables, wherein the entitlement tables are usable by multiple relational databases; receiving a request, from a user, for access to requested data in a relational database, wherein the user is identified by a user identifier that is set by a relational database program; and determining if the user is authorized to access the table, as well as the requested data, by comparing the user identifier with an entry in an entitlement table that is associated with the requested data in the relational database, wherein the entitlement table defines which data classifications are authorized to be accessed by the user. This method provides a practical application that is useful, concrete and tangible since multiple disparate databases (including those found in the program DB2) can now, through the use of the present invention, have entitlement controlled by a single entitlement table object. In one embodiment, the plurality of entitlement tables have a priority hierarchy, wherein the priority hierarchy defines a higher priority entitlement table as being dominant to, and therefore overrides, a lower priority entitlement table.

The method may further include the step of, in response to determining an existence of a higher priority entitlement table that overrides a lower priority entitlement table, controlling access to the requested data according to entitlement criteria for the user identifier found in the higher priority entitlement table. This user identifier may be extracted from a header in the request for the requested data, wherein the SQL identifier was created by the DB2 relational database program for the user when the user logged into the DB2 relational database program. In one embodiment, at least one of the plurality of entitlement tables includes only rules for inclusion that permit a user with a specific user identifier to access the requested data, and wherein at least one of the plurality of entitlement tables includes only rules for exclusion that prohibit a user from accessing the requested data. Note also, that in one embodiment, access to requested data is limited to a single row of data in a relational database. In another embodiment, the method may further include the steps of: receiving, by an Assistance Allocation Manager (AAM), an Assistance Initiating Data (AID) from a resource in a data processing system; and in response to receiving the AID, executing a rule, in the AAM, that is specific for the AID and the resource that sent the AID, wherein executing the rule in the AAM causes the steps described herein to be executed for the resource that sent the AID.

The above, as well as additional purposes, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further purposes and advantages thereof, will best be understood by reference to the following detailed description of an illustrative embodiment when read in conjunction with the accompanying drawings, where:

FIG. 1b illustrates exemplary detail of the entitlement table and database shown in FIG. 1a;

FIG. 2 is a flow-chart of exemplary steps taken in to utilize autonomous entitlement tables to afford access to data in a database;

FIGS. 6a-c are flow-charts showing steps taken to deploy in a Virtual Private Network (VPN) software that is capable of executing the steps shown in FIGS. 1a-2;

DETAILED DESCRIPTION OF THE PREFERRED EMBODIMENT

Figure 1A:
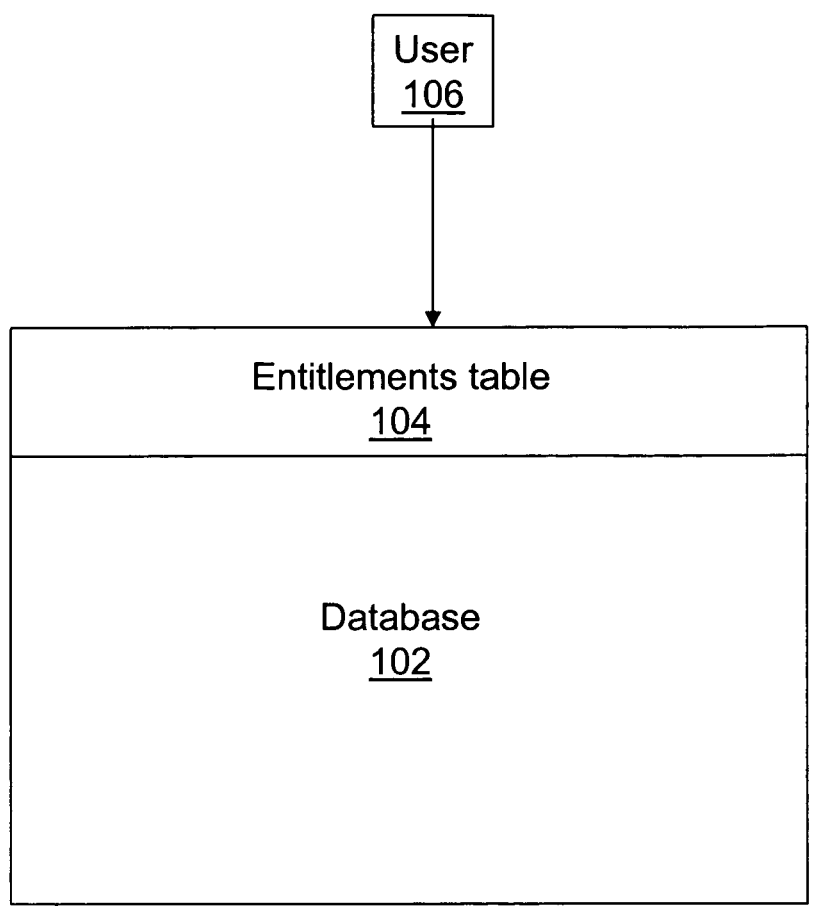
FIG. 1a depicts an entitlement table that is superior to, and autonomous to, a database in a relational database system.

With reference now to the figures, and in particular to FIG. 1a, a relational database 102, found in a database management system, is shown for communicating data to a user 106. Note, however, that the user must go through an entitlements table 104 in order to gain access to the database 102. This entitlements table 104 is autonomous from database 102, since the same entitlement table 104 may be utilized by multiple different databases 102.

Figure 1B:
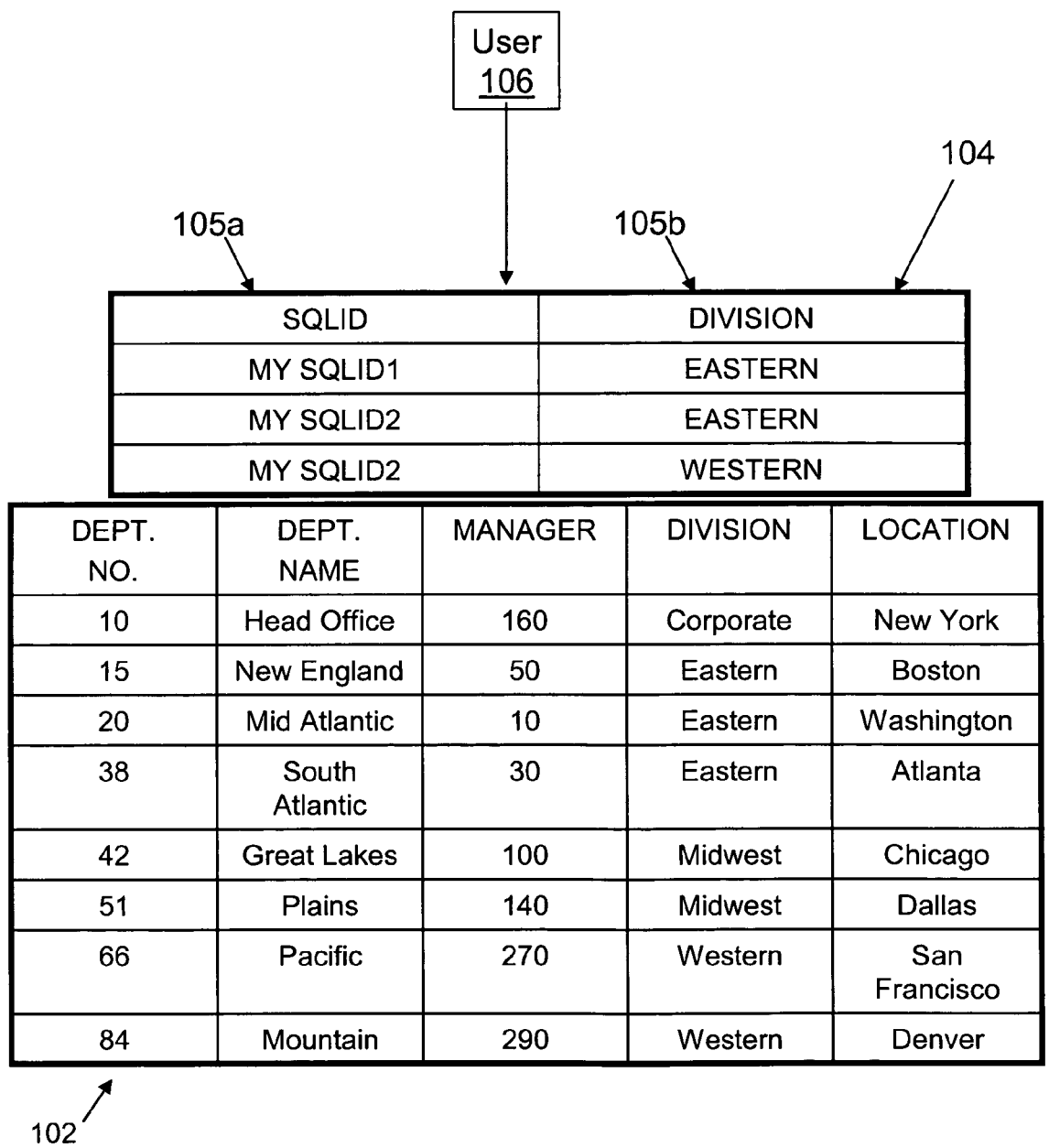

As an example of the entitlement table 104 and its functionality, reference is now made to FIG. 1b. Exemplary entitlement table 104 has two columns 105a-b. Column 105a lists different Structured Query Language Identifiers (SQLID). (Note that the Structured Query Language (SQL), as defined by both the American National Standards Institute (ANSI) as well as the International Standards Organization (ISO), is a computer language, known to those skilled in the art of relational databases, that is used to create, modify, retrieve and manipulate data from relational database management systems. Standards describing SQL, issued by ANSI and/or ISO, including SQL:2003 and subsequent editions, are herein incorporated by reference in their entirety.) Each SQLID (e.g., MY SQLID1, MY SQLID2) is associated with an enterprise's division, which are listed in column 105b.

For example, when a user logs into a structured database such as DB2™, DB2 automatically assigns that user a SQLID such as "MY SQLID1" or "MY SQLID2." If that user's SQLID is "MY SQLID1," then that user is authorized by (i.e., entitled by) entitlement table 104 to access any row of data in which "EASTERN" is listed as a "DIVISION" (assuming that the user is entitled to access the table according to a current state of authentication and authorization statuses). Similarly, if the user has a SQLID of "MY SQLID2," then that user may access any row of data for either the "EASTERN" or "WESTERN" division of the enterprise. Thus, in the example shown in FIG. 1b, the user who has been assigned (by DB2) the SQLID of "MY SQLID1" may access the rows of data denoted by Department Numbers 15, 20 and 38, while users having the SQLID of "MY SQLID2" may access the rows of data denoted by Department Numbers 15, 20, 38, 66 and 84. Note that entitlement table 104 may be used for multiple disparate databases (not shown), thus affording the desired scalability of the entitlement afforded by entitlement table 104.

Figure 1C:
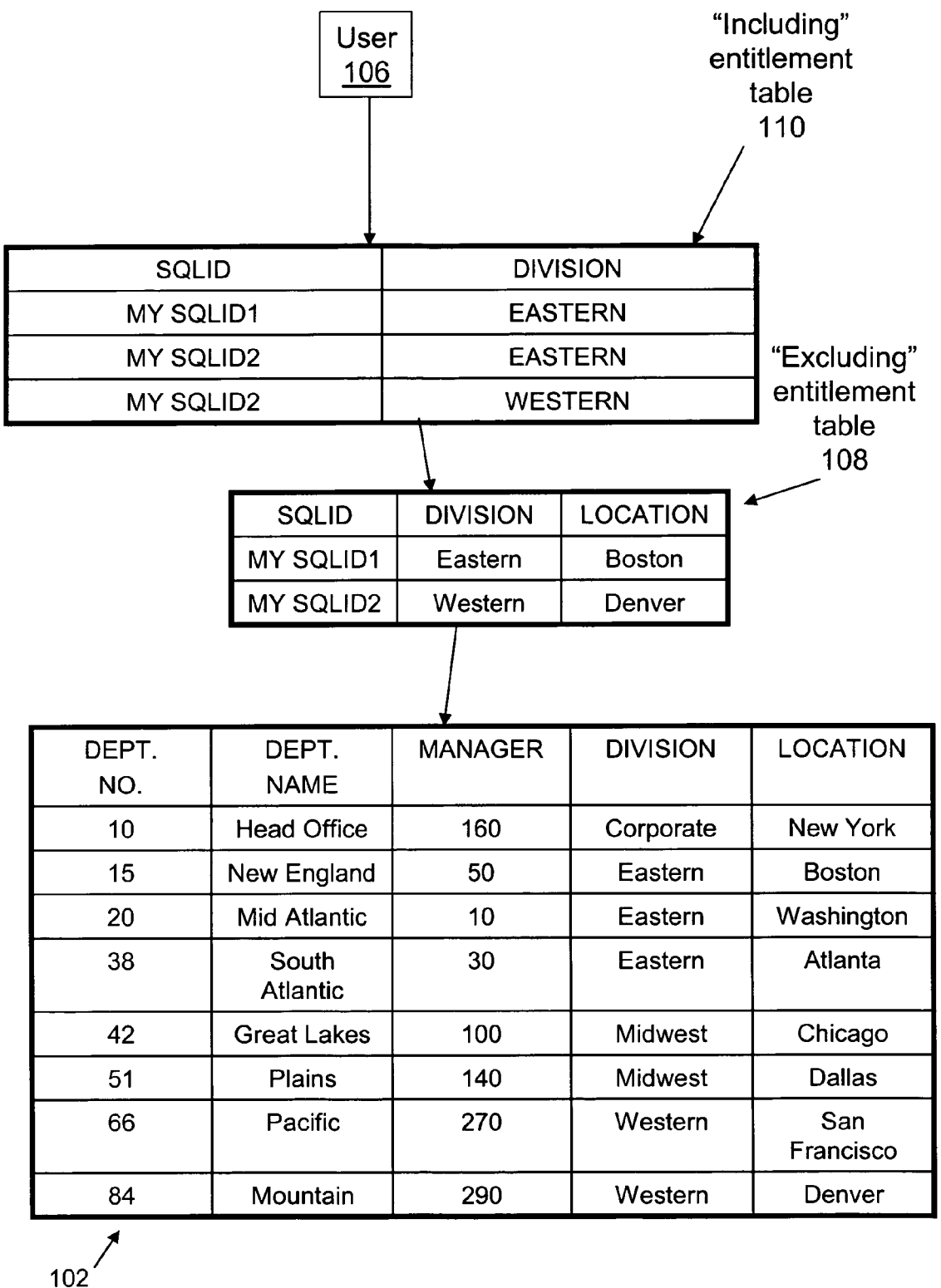
FIG. 1c depicts multiple entitlement tables that have a hierarchical relationship between entitlement tables.

With reference now to FIG. 1c, two preferred features of entitlement tables are presented. These two features are 1) "including/excluding" features; and 2) hierarchy. To understand the "including/excluding" feature, consider "excluding" entitlement table 108. As suggested by its name, "excluding" entitlement table 108 excludes (prohibits) any user with an SQLID of "MY SQLID1" from accessing data in any row that has "Eastern" as a "Division" OR "Boston" as a "Location." Alternatively, "excluding" entitlement table 108 may prohibit access to any data in a row that has both "Eastern" as a "Division" AND "Boston" as a "Location." Similar conditions are placed on a user having a SQLID of "MY SQLID2," in which the user is prohibited from access data in any row that has "Western" and/or "Denver" in the respective "Division" and "Location" columns. Continuing with the example of the user with the SQLID of "MY SQLID1," this user is prohibited from accessing data denoted as being for Department 15 (if the exclusion is based on both "Eastern" and "Boston" being in the same row). Alternatively, this user is prohibited from accessing data denoted for Departments 15, 20 and 38 (if the exclusion is based on either "Eastern" or "Boston" being in a row).

"Including" entitlement table 110, as its name suggests, shows which rows of data are expressly authorized for a particular SQLID. For example, a user having the SQLID of "MY SQLID1" is expressly authorized to access any row of data in which "Eastern" is listed as the "Division" for which the data is appropriate. Furthermore, an "including" entitlement table 110 may have multiple columns, thus indicating that user having a specific SQLID may access a row of data that has all listed entries in a row ("AND") or just one of the entries in a row ("OR"), in a manner similar to that described above for "excluding" entitlement table 108.

Consider now the concept of hierarchy among entitlement tables. For exemplary purposes, assume that "excluding" entitlement table 108 is a higher priority entitlement table that is dominant to, and therefore overrides, the lower priority "including" entitlement table 110. (Note that the "including" and "excluding" natures of the entitlement tables are NOT linked to the hierarchy level of an entitlement table.) In this example, also assume that "excluding" entitlement table 108 is an "AND" type of table, in which a user is excluded from accessing data that has both the listed Division and Location. In this example, then, a user with the SQLID of "MY SQLID1" will not be able to access data in any row that has both "Eastern" and "Boston" as data in that row (since "excluding" entitlement table 108 is an "AND" table having "Eastern" and "Boston" as the excluding features), but will still be able to access data in rows for "Eastern" divisions that are NOT in "Boston" (i.e., Washington and Atlanta), since the entitlement afforded by "including" entitlement table 110 is not overridden by higher "excluding" entitlement table 108 for Washington and Atlanta.

Note again that entitlement tables 108 and 110 are autonomous from each other and the database 102. That is, a program can call up an object that establishes "including" entitlement table 110, an object that establishes "excluding" entitlement table 108, or both entitlement table 108 and 110. Similarly, entitlement table 110 can be in a hierarchical relationship with another "excluding" entitlement table (not shown) and/or one or more "including" entitlement tables (also not shown). Thus, this system of "including" entitlement tables and "excluding" entitlement tables is scalable, since any type and number of entitlement tables may be called to provide various levels of granularity in defining which users may access particular data in a relational database.

With reference now to FIG. 2, a flow-chart of exemplary steps taken by the present invention is presented. After initiator block 202, entitlement table objects are defined and created (block 204). As described above, these entitlement tables define which users are authorized ("including" entitlement table) or unauthorized ("excluding" entitlement table) to access a specific row of data in a relational database. A hierarchy is then established, preferably by a software developer who is creating a set of rules for access to the relational database, which defines the priority levels of each of the created entitlement tables (block 206). When a request is received for data in a particular row in the relational database table (block 208), a check is made to determine if the user that has issued the request is entitled to access the table itself (block 209). If the requesting user is entitled to access the table that has the requested data, then the requesting user's identity is derived by extracting his SQLID from a header in the request (block 210). A query (query block 212) is then made of a first entitlement table to determine if the user, who has the SQLID that was extracted from the request header, is authorized by that entitlement table to access the row in which the requested data resides in the database table. If not, then an "Access Denied" message is sent (block 214) to the requesting user, a system administrator, an Assistance Allocation Manager (e.g., AAM 906 described below with reference to FIG. 9), or any other relevant entity, and the process ends (termination block 216). If the entitlement table DOES allow the user to access that specified row, then a query (query block 218) is made to determine if there are any entitlement tables that have a higher priority than the first entitlement table. If so, then access authorization for the requesting user (with the particular SQLID) is made dependent on the re-iteration of the steps shown in query block 212 and 218 until a final determination is made to either deny the user access to the specific row of data (block 214) or to allow access to the specific row of data (block 220).

Figure 3:
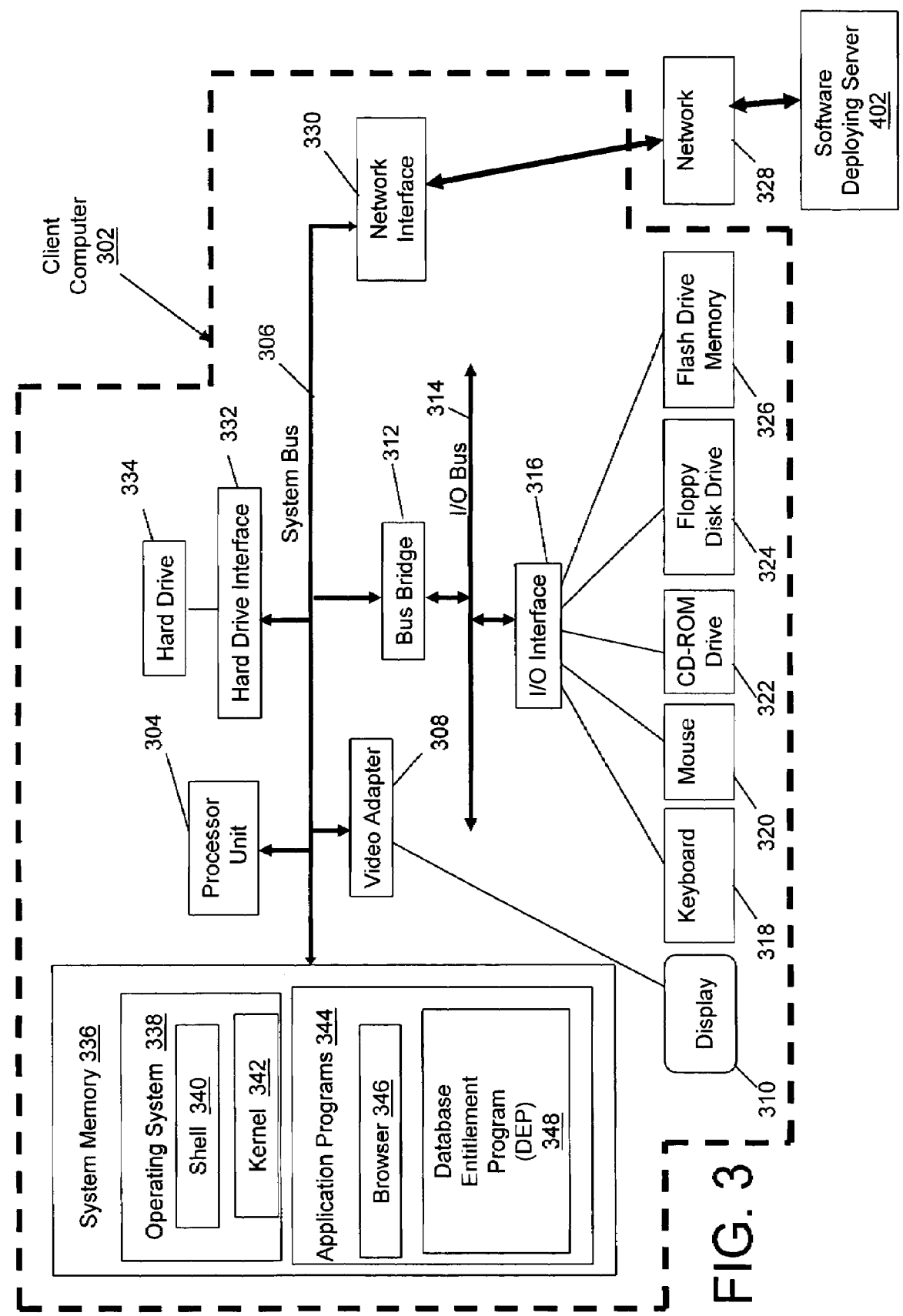
FIG. 3 depicts an exemplary client computer which can be utilized in accordance with the present invention.

With reference now to FIG. 3, there is depicted a block diagram of an exemplary client computer 302, in which the present invention may be utilized. Client computer 302 includes a processor unit 304 that is coupled to a system bus 306. A video adapter 308, which drives/supports a display 310, is also coupled to system bus 306. System bus 306 is coupled via a bus bridge 312 to an Input/Output (I/O) bus 314. An I/O interface 316 is coupled to I/O bus 314. I/O interface 316 affords communication with various I/O devices, including a keyboard 318, a mouse 320, a Compact Disk—Read Only Memory (CD-ROM) drive 322, a floppy disk drive 324, and a flash drive memory 326. The format of the ports connected to I/0 interface 316 may be any known to those skilled in the art of computer architecture, including but not limited to Universal Serial Bus (USB) ports.

Client computer 302 is able to communicate with a software deploying server 402 via a network 328 using a network interface 330, which is coupled to system bus 306. Network 328 may be an external network such as the Internet, or an internal network such as an Ethernet or a Virtual Private Network (VPN).

A hard drive interface 332 is also coupled to system bus 306. Hard drive interface 332 interfaces with a hard drive 334. In a preferred embodiment, hard drive 334 populates a system memory 336, which is also coupled to system bus 306. System memory is defined as a lowest level of volatile memory in client computer 302. This volatile memory includes additional higher levels of volatile memory (not shown), including, but not limited to, cache memory, registers and buffers. Data that populates system memory 336 includes client computer 302's operating system (OS) 338 and application programs 344.

OS 338 includes a shell 340, for providing transparent user access to resources such as application programs 344. Generally, shell 340 is a program that provides an interpreter and an interface between the user and the operating system. More specifically, shell 340 executes commands that are entered into a command line user interface or from a file. Thus, shell 340 (as it is called in UNIX®), also called a command processor in Windows®, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 342) for processing. Note that while shell 340 is a text-based, line-oriented user interface, the present invention will equally well support other user interface modes, such as graphical, voice, gestural, etc.

As depicted, OS 338 also includes kernel 342, which includes lower levels of functionality for OS 338, including providing essential services required by other parts of OS 338 and application programs 344, including memory management, process and task management, disk management, and mouse and keyboard management.

Application programs 344 include a browser 346. Browser 346 includes program modules and instructions enabling a World Wide Web (WWW) client (i.e., client computer 302) to send and receive network messages to the Internet using HyperText Transfer Protocol (HTTP) messaging, thus enabling communication with software deploying server 402.

Application programs 344 in client computer 302's system memory also include a Database Entitlement Program (DEP) 348. DEP 348 includes code for implementing the processes described in FIGS. 1a-2. In one embodiment, client computer 302 is able to download DEP 348 from software deploying server 402.

The hardware elements depicted in client computer 302 are not intended to be exhaustive, but rather are representative to highlight essential components required by the present invention. For instance, client computer 302 may include alternate memory storage devices such as magnetic cassettes, Digital Versatile Disks (DVDs), Bernoulli cartridges, and the like. These and other variations are intended to be within the spirit and scope of the present invention.

Figure 4:
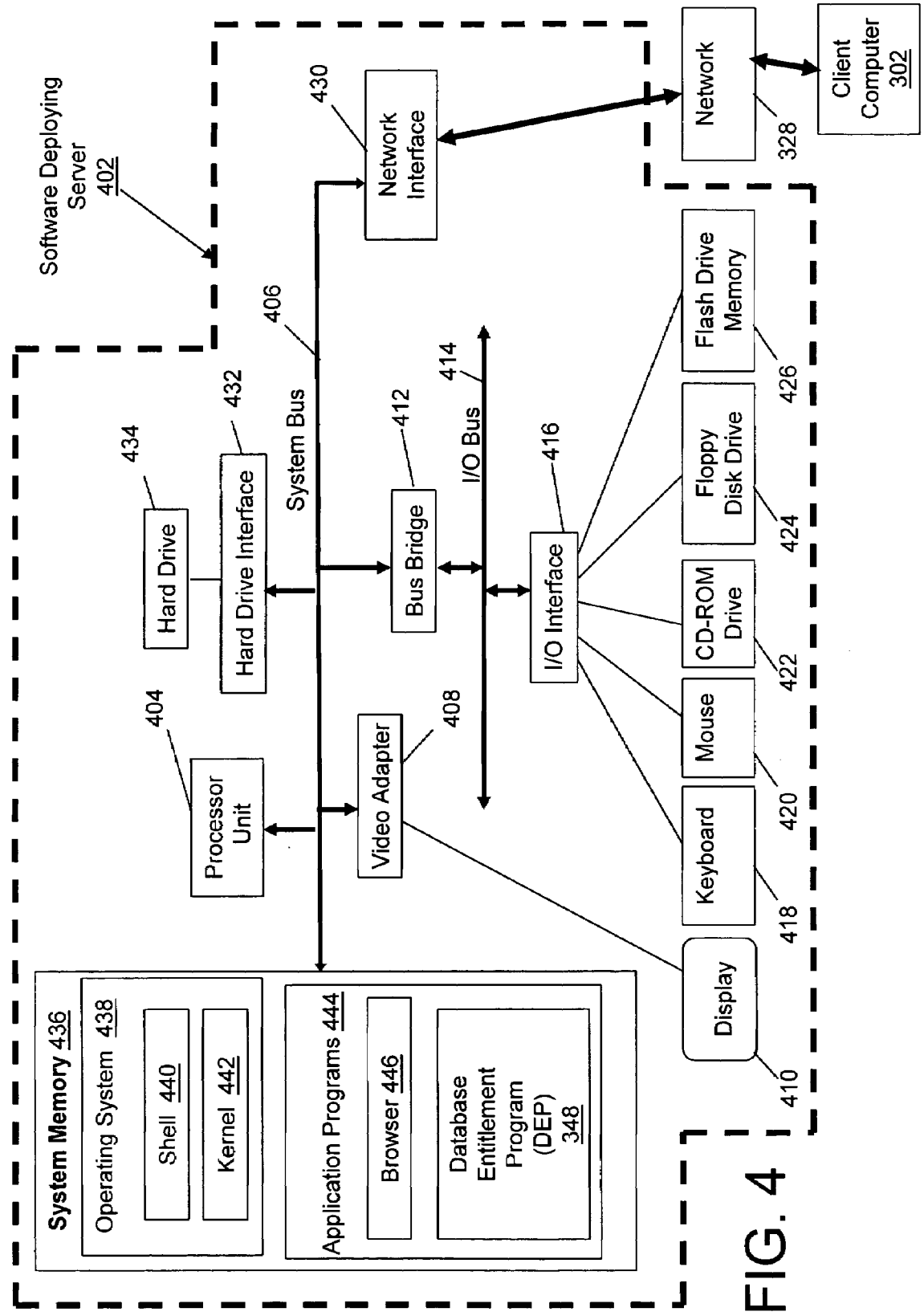
FIG. 4 illustrates a software deploying server that is capable of deploying software to the client computer shown in FIG. 3 to implement the present invention.

As noted above, DEP 348 can be downloaded to client computer 302 from software deploying server 402, shown in exemplary form in FIG. 4. Software deploying server 402 includes a processor unit 404 that is coupled to a system bus 406. A video adapter 408 is also coupled to system bus 406. Video adapter 408 drives/supports a display 410. System bus 406 is coupled via a bus bridge 412 to an Input/Output (I/O) bus 414. An I/O interface 416 is coupled to I/O bus 414. I/O interface 416 affords communication with various I/O devices, including a keyboard 418, a mouse 420, a Compact Disk—Read Only Memory (CD-ROM) drive 422, a floppy disk drive 424, and a flash drive memory 426. The format of the ports connected to I/O interface 416 may be any known to those skilled in the art of computer architecture, including but not limited to Universal Serial Bus (USB) ports.

Software deploying server 402 is able to communicate with client computer 302 via network 328 using a network interface 430, which is coupled to system bus 406. Access to network 328 allows software deploying server 402 to deploy DEP 348 to client computer 302.

System bus 406 is also coupled to a hard drive interface 432, which interfaces with a hard drive 434. In a preferred embodiment, hard drive 434 populates a system memory 436, which is also coupled to system bus 406. Data that populates system memory 436 includes software deploying server 402's operating system 438, which includes a shell 440 and a kernel 442. Shell 440 is incorporated in a higher level operating system layer and utilized for providing transparent user access to resources such as application programs 444, which include a browser 446, and a copy of DEP 348 described above, which can be deployed to client computer 302.

The hardware elements depicted in software deploying server 402 are not intended to be exhaustive, but rather are representative to highlight essential components required by the present invention. For instance, software deploying server 402 may include alternate memory storage devices such as flash drives, magnetic cassettes, Digital Versatile Disks (DVDs), Bernoulli cartridges, and the like. These and other variations are intended to be within the spirit and scope of the present invention.

Note further that, in a preferred embodiment of the present invention, software deploying server 402 performs all of the functions associated with the present invention (including execution of DEP 348), thus freeing client computer 302 from having to use its own internal computing resources to execute DEP 348.

It should be understood that at least some aspects of the present invention may alternatively be implemented in a computer-useable medium that contains a program product. Programs defining functions on the present invention can be delivered to a data storage system or a computer system via a variety of signal-bearing media, which include, without limitation, non-writable storage media (e.g., CD-ROM), writable storage media (e.g., hard disk drive, read/write CD ROM, optical media), system memory such as but not limited to Random Access Memory (RAM), and communication media, such as computer and telephone networks including Ethernet, the Internet, wireless networks, and like network systems. It should be understood, therefore, that such signal-bearing media when carrying or encoding computer readable instructions that direct method functions in the present invention, represent alternative embodiments of the present invention. Further, it is understood that the present invention may be implemented by a system having means in the form of hardware, software, or a combination of software and hardware as described herein or their equivalent.

Software Deployment

Thus, the method described herein, and in particular as shown and described in FIGS. 1*a*-2, can be deployed as a process software from software deploying server 402 (shown in FIG. 4) to client computer 302 (shown in FIG. 3).

Figure 5A:
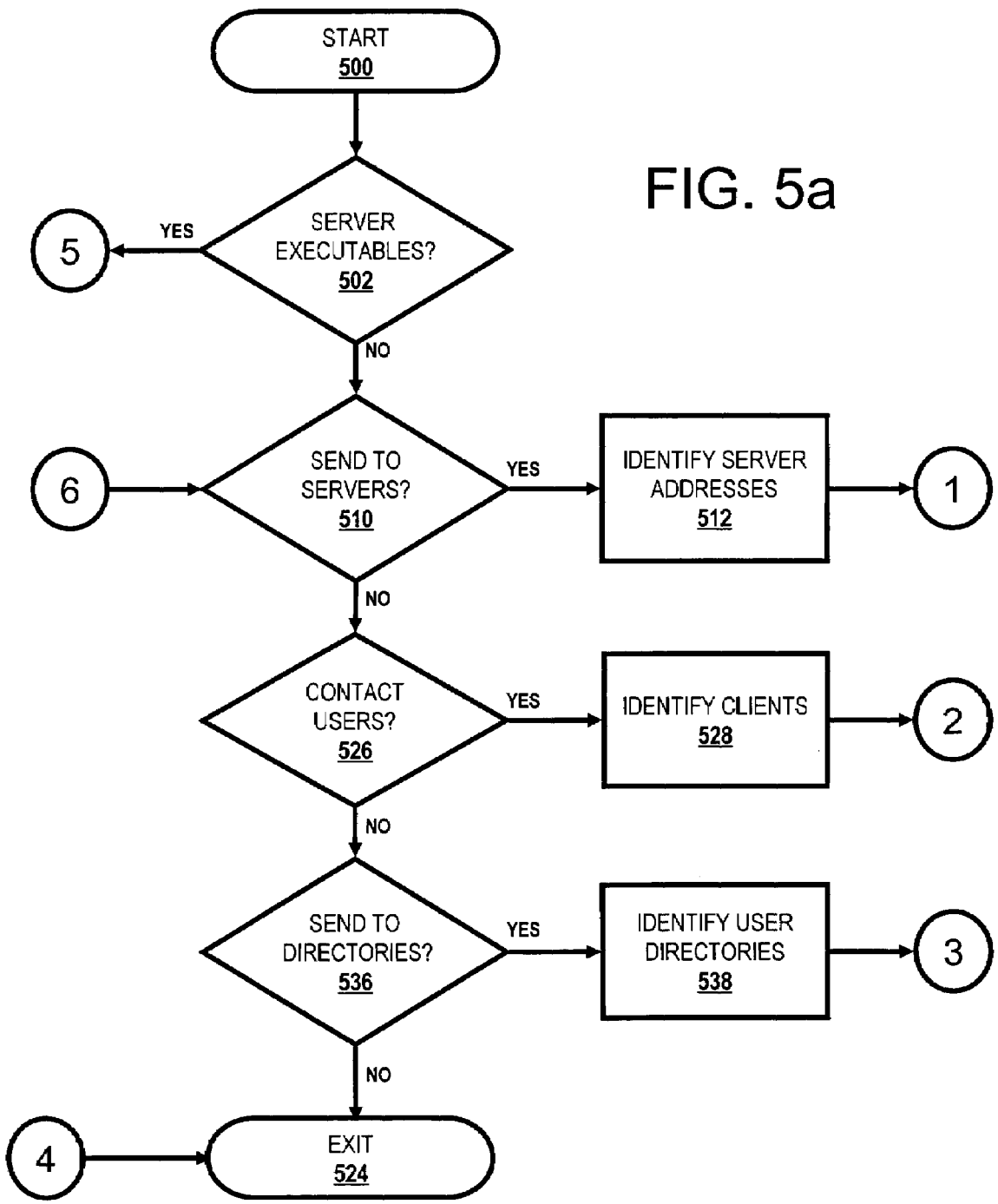
FIGS. 5a-b are flow-chart showing steps taken to deploy software capable of executing the steps shown in FIGS. 1a-2.
Figure 5B:
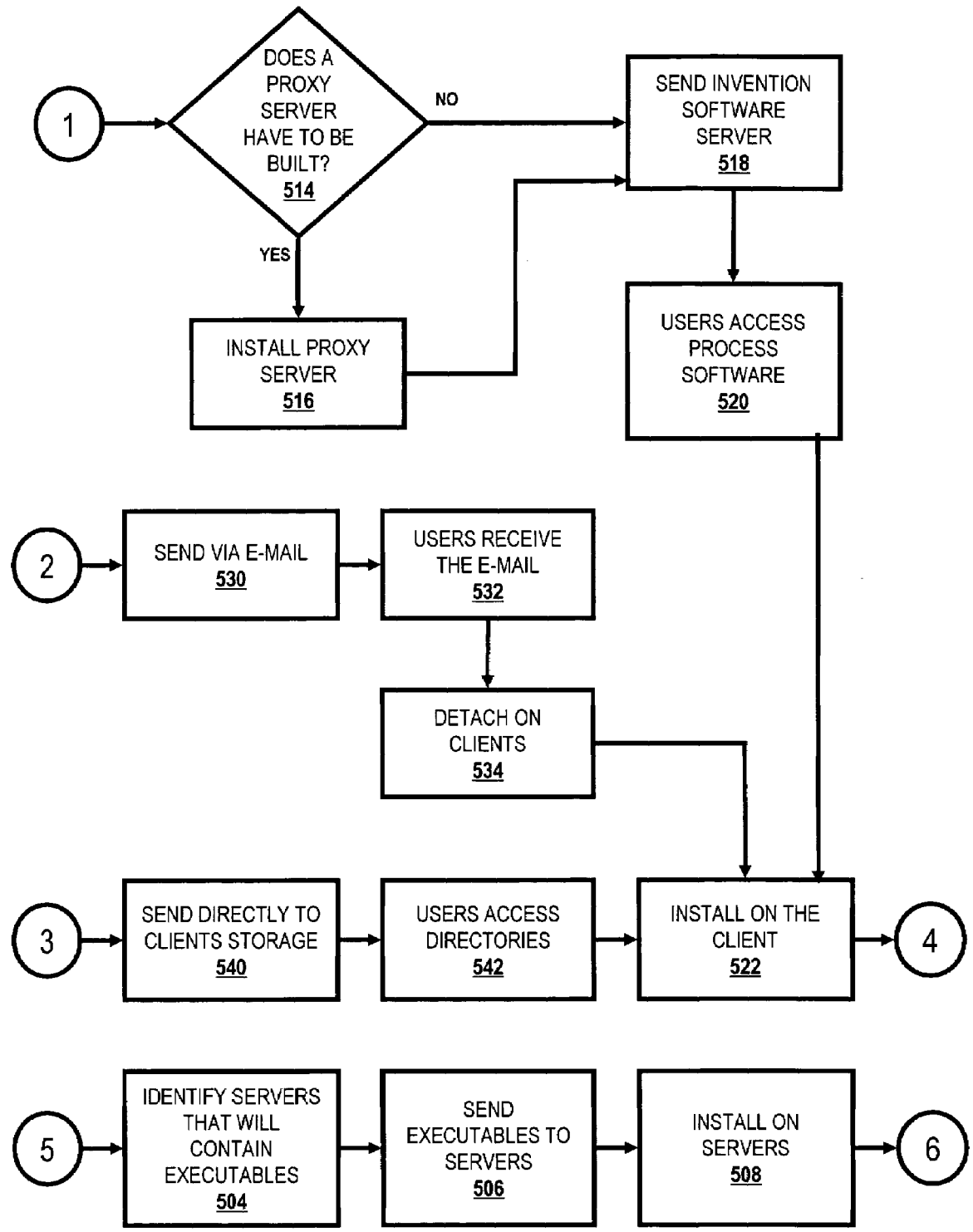

Referring then to FIGS. 5*a*-*b*, step 500 begins the deployment of the process software. The first thing is to determine if there are any programs that will reside on a server or servers when the process software is executed (query block 502). If this is the case, then the servers that will contain the executables are identified (block 504). The process software for the server or servers is transferred directly to the servers' storage via File Transfer Protocol (FTP) or some other protocol or by copying though the use of a shared file system (block 506). The process software is then installed on the servers (block 508).

Next, a determination is made on whether the process software is to be deployed by having users access the process software on a server or servers (query block 510). If the users are to access the process software on servers, then the server addresses that will store the process software are identified (block 512).

A determination is made if a proxy server is to be built (query block 514) to store the process software. A proxy server is a server that sits between a client application, such as a Web browser, and a real server. It intercepts all requests to the real server to see if it can fulfill the requests itself. If not, it forwards the request to the real server. The two primary benefits of a proxy server are to improve performance and to filter requests. If a proxy server is required, then the proxy server is installed (block 516). The process software is sent to the servers either via a protocol such as FTP or it is copied directly from the source files to the server files via file sharing (block 518). Another embodiment would be to send a transaction to the servers that contained the process software and have the server process the transaction, then receive and copy the process software to the server's file system. Once the process software is stored at the servers, the users, via their client computers, then access the process software on the servers and copy to their client computers file systems (block 520). Another embodiment is to have the servers automatically copy the process software to each client and then run the installation program for the process software at each client computer. The user executes the program that installs the process software on his client computer (i.e., client computer 302) (block 522) then exits the process (terminator block 524).

In query step 526, a determination is made whether the process software is to be deployed by sending the process software to users via e-mail. The set of users where the process software will be deployed are identified together with the addresses of the user client computers (block 528). The process software is sent via e-mail to each of the users' client computers (block 530). The users then receive the e-mail (block 532) and then detach the process software from the e-mail to a directory on their client computers (block 534). The user executes the program that installs the process software on his client computer (block 522) then exits the process (terminator block 524).

Lastly a determination is made on whether the process software will be sent directly to user directories on their client computers (query block 536). If so, the user directories are identified (block 538). The process software is transferred directly to the user's client computer directory (block 540). This can be done in several ways such as, but not limited to, sharing of the file system directories and then copying from the sender's file system to the recipient user's file system or alternatively using a transfer protocol such as File Transfer Protocol (FTP). The users access the directories on their client file systems in preparation for installing the process software (block 542). The user executes the program that installs the process software on his client computer (block 522) and then exits the process (terminator block 524).

VPN Deployment

The present software can be deployed to third parties as part of a service wherein a third party VPN service is offered as a secure deployment vehicle or wherein a VPN is built on-demand as required for a specific deployment.

A virtual private network (VPN) is any combination of technologies that can be used to secure a connection through an otherwise unsecured or untrusted network. VPNs improve security and reduce operational costs. The VPN makes use of a public network, usually the Internet, to connect remote sites or users together. Instead of using a dedicated, real-world connection such as leased line, the VPN uses "virtual" connections routed through the Internet from the company's private network to the remote site or employee. Access to the software via a VPN can be provided as a service by specifically constructing the VPN for purposes of delivery or execution of the process software (i.e. the software resides elsewhere) wherein the lifetime of the VPN is limited to a given period of time or a given number of deployments based on an amount paid.

The process software may be deployed, accessed and executed through either a remote-access or a site-to-site VPN. When using the remote-access VPNs the process software is deployed, accessed and executed via the secure, encrypted connections between a company's private network and remote users through a third-party service provider. The enterprise service provider (ESP) sets a network access server (NAS) and provides the remote users with desktop client software for their computers. The telecommuters can then dial a toll-free number or attach directly via a cable or DSL modem to reach the NAS and use their VPN client software to access the corporate network and to access, download and execute the process software.

When using the site-to-site VPN, the process software is deployed, accessed and executed through the use of dedicated equipment and large-scale encryption that are used to connect a company's multiple fixed sites over a public network such as the Internet.

The process software is transported over the VPN via tunneling which is the process of placing an entire packet within another packet and sending it over a network. The protocol of the outer packet is understood by the network and both points, called tunnel interfaces, where the packet enters and exits the network.

Figure 6C:
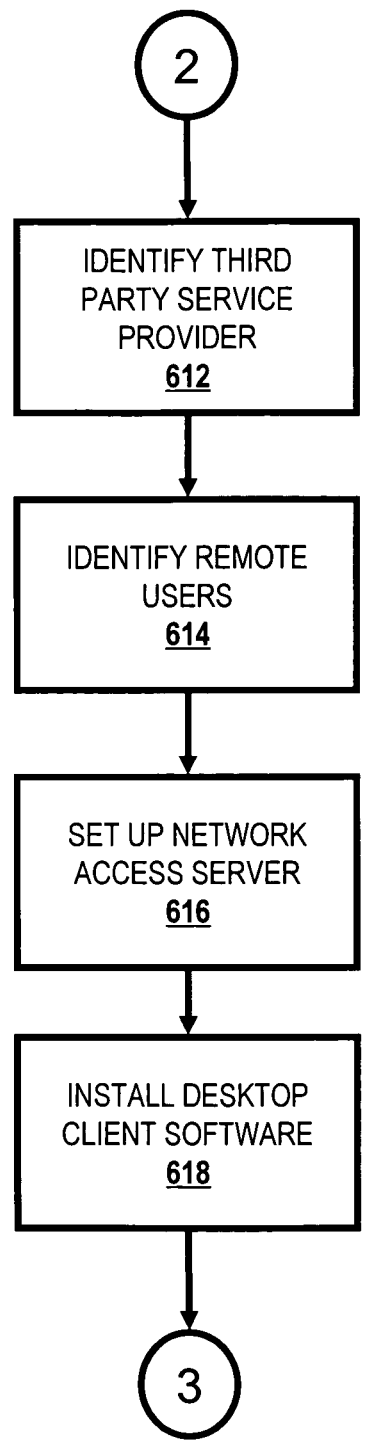

The process for such VPN deployment is described in FIGS. 6*a*-*c*. Initiator block 602 begins the Virtual Private Network (VPN) process. A determination is made to see if a VPN for remote access is required (query block 604). If it is not required, then proceed to query block 606. If it is required, then determine if the remote access VPN exists (query block 608).

If a VPN does exist, then proceed to block 610. Otherwise identify a third party provider that will provide the secure, encrypted connections between the company's private network and the company's remote users (block 612). The company's remote users are identified (block 614). The third party provider then sets up a network access server (NAS) (block 616) that allows the remote users to dial a toll free number or attach directly via a broadband modem to access, download and install the desktop client software for the remote-access VPN (block 618).

After the remote access VPN has been built or if it has been previously installed, the remote users can access the process software by dialing into the NAS or attaching directly via a cable or DSL modem into the NAS (block 610). This allows entry into the corporate network where the process software is accessed (block 620). The process software is transported to the remote user's desktop over the network via tunneling. That is, the process software is divided into packets and each packet including the data and protocol is placed within another packet (block 622). When the process software arrives at the remote user's desktop, it is removed from the packets, reconstituted and then is executed on the remote user's desktop (block 624).

A determination is then made to see if a VPN for site to site access is required (query block 606). If it is not required, then proceed to exit the process (terminator block 626). Otherwise, determine if the site to site VPN exists (query block 628). If it does exist, then proceed to block 630. Otherwise, install the dedicated equipment required to establish a site to site VPN (block 638). Then build the large scale encryption into the VPN (block 640).

After the site to site VPN has been built or if it had been previously established, the users access the process software via the VPN (block 630). The process software is transported to the site users over the network via tunneling (block 632). That is the process software is divided into packets and each packet including the data and protocol is placed within another packet (block 634). When the process software arrives at the remote user's desktop, it is removed from the packets, reconstituted and is executed on the site user's desktop (block 636). The process then ends at terminator block 626.

Software Integration

The process software which consists of code for implementing the process described herein may be integrated into a client, server and network environment by providing for the process software to coexist with applications, operating systems and network operating systems software and then installing the process software on the clients and servers in the environment where the process software will function.

The first step is to identify any software on the clients and servers including the network operating system where the process software will be deployed that are required by the process software or that work in conjunction with the process software. This includes the network operating system that is software that enhances a basic operating system by adding networking features.

Next, the software applications and version numbers will be identified and compared to the list of software applications and version numbers that have been tested to work with the process software. Those software applications that are missing or that do not match the correct version will be upgraded with the correct version numbers. Program instructions that pass parameters from the process software to the software applications will be checked to ensure the parameter lists match the parameter lists required by the process software. Conversely parameters passed by the software applications to the process software will be checked to ensure the parameters match the parameters required by the process software. The client and server operating systems including the network operating systems will be identified and compared to the list of operating systems, version numbers and network software that have been tested to work with the process software. Those operating systems, version numbers and network software that do not match the list of tested operating systems and version numbers will be upgraded on the clients and servers to the required level.

After ensuring that the software, where the process software is to be deployed, is at the correct version level that has been tested to work with the process software, the integration is completed by installing the process software on the clients and servers.

Figure 7A:
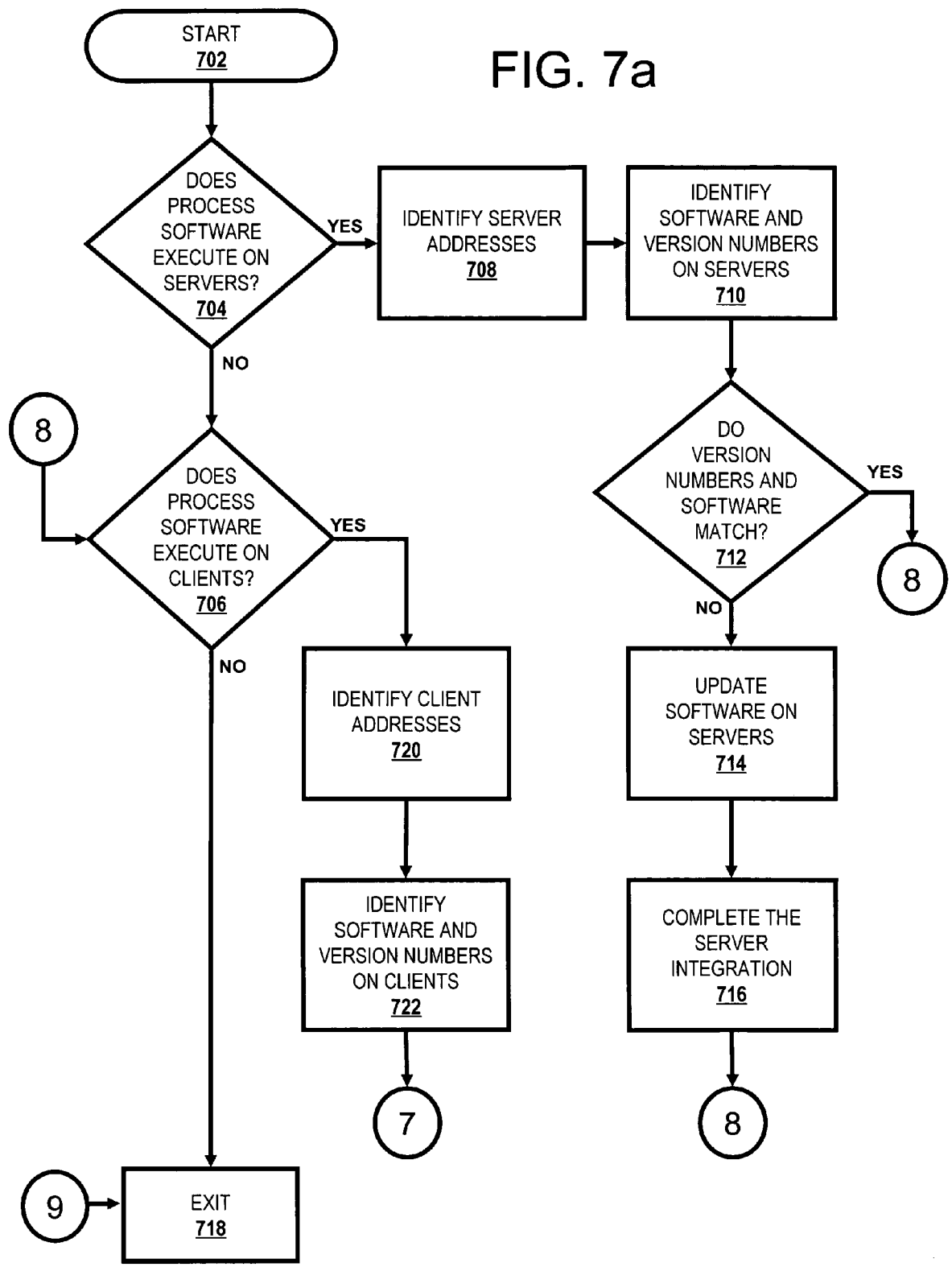
FIGS. 7a-b are flow-charts showing steps taken to integrate into an computer system software that is capable of executing the steps shown in FIGS. 1a-2.
Figure 7B:
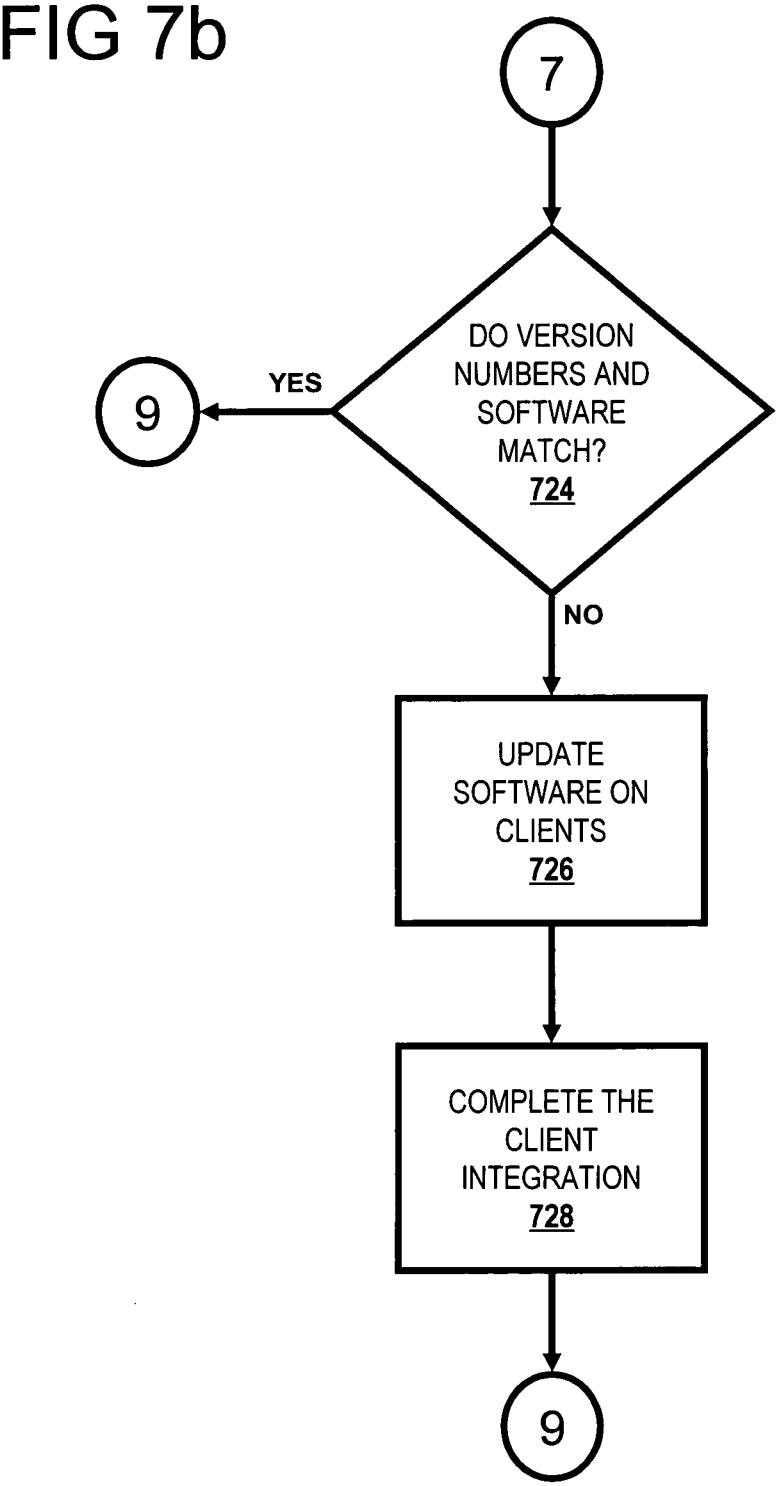

For a high-level description of this process, reference is now made to FIG. 7. Initiator block 702 begins the integration of the process software. The first tiling is to determine if there are any process software programs that will execute on a server or servers (block 704). If this is not the case, then integration proceeds to query block 706. If this is the case, then the server addresses are identified (block 708). The servers are checked to see if they contain software that includes the operating system (OS), applications, and network operating systems (NOS), together with their version numbers, which have been tested with the process software (block 710). The servers are also checked to determine if there is any missing software that is required by the process software in block 710.

A determination is made if the version numbers match the version numbers of OS, applications and NOS that have been tested with the process software (block 712). If all of the versions match and there is no missing required software the integration continues in query block 706.

If one or more of the version numbers do not match, then the unmatched versions are updated on the server or servers with the correct versions (block 714). Additionally, if there is missing required software, then it is updated on the server or servers in the step shown in block 714. The server integration is completed by installing the process software (block 716).

The step shown in query block 706, which follows either the steps shown in block 704, 712 or 716 determines if there are any programs of the process software that will execute on the clients. If no process software programs execute on the clients the integration proceeds to terminator block 718 and exits. If this not the case, then the client addresses are identified as shown in block 720.

The clients are checked to see if they contain software that includes the operating system (OS), applications, and network operating systems (NOS), together with their version numbers, which have been tested with the process software (block 722). The clients are also checked to determine if there is any missing software that is required by the process software in the step described by block 722.

A determination is made is the version numbers match the version numbers of OS, applications and NOS that have been tested with the process software (query block 724). If all of the versions match and there is no missing required software, then the integration proceeds to terminator block 718 and exits.

If one or more of the version numbers do not match, then the unmatched versions are updated on the clients with the correct versions (block 726). In addition, if there is missing required software then it is updated on the clients (also block 726). The client integration is completed by installing the process software on the clients (block 728). The integration proceeds to terminator block 718 and exits.

On Demand

The process software is shared, simultaneously serving multiple customers in a flexible, automated fashion. It is standardized, requiring little customization and it is scalable, providing capacity on demand in a pay-as-you-go model.

The process software can be stored on a shared file system accessible from one or more servers. The process software is executed via transactions that contain data and server processing requests that use CPU units on the accessed server. CPU units are units of time such as minutes, seconds, hours on the central processor of the server. Additionally the assessed server may make requests of other servers that require CPU units. CPU units are an example that represents but one measurement of use. Other measurements of use include but are not limited to network bandwidth, memory usage, storage usage, packet transfers, complete transactions etc.

When multiple customers use the same process software application, their transactions are differentiated by the parameters included in the transactions that identify the unique customer and the type of service for that customer. All of the CPU units and other measurements of use that are used for the services for each customer are recorded. When the number of transactions to any one server reaches a number that begins to affect the performance of that server, other servers are accessed to increase the capacity and to share the workload. Likewise when other measurements of use such as network bandwidth, memory usage, storage usage, etc. approach a capacity so as to affect performance, additional network bandwidth, memory usage, storage etc. are added to share the workload.

The measurements of use used for each service and customer are sent to a collecting server that sums the measurements of use for each customer for each service that was processed anywhere in the network of servers that provide the shared execution of the process software. The summed measurements of use units are periodically multiplied by unit costs and the resulting total process software application service costs are alternatively sent to the customer and or indicated on a web site accessed by the customer which then remits payment to the service provider.

In another embodiment, the service provider requests payment directly from a customer account at a banking or financial institution.

In another embodiment, if the service provider is also a customer of the customer that uses the process software application, the payment owed to the service provider is reconciled to the payment owed by the service provider to minimize the transfer of payments.

Figure 8A:
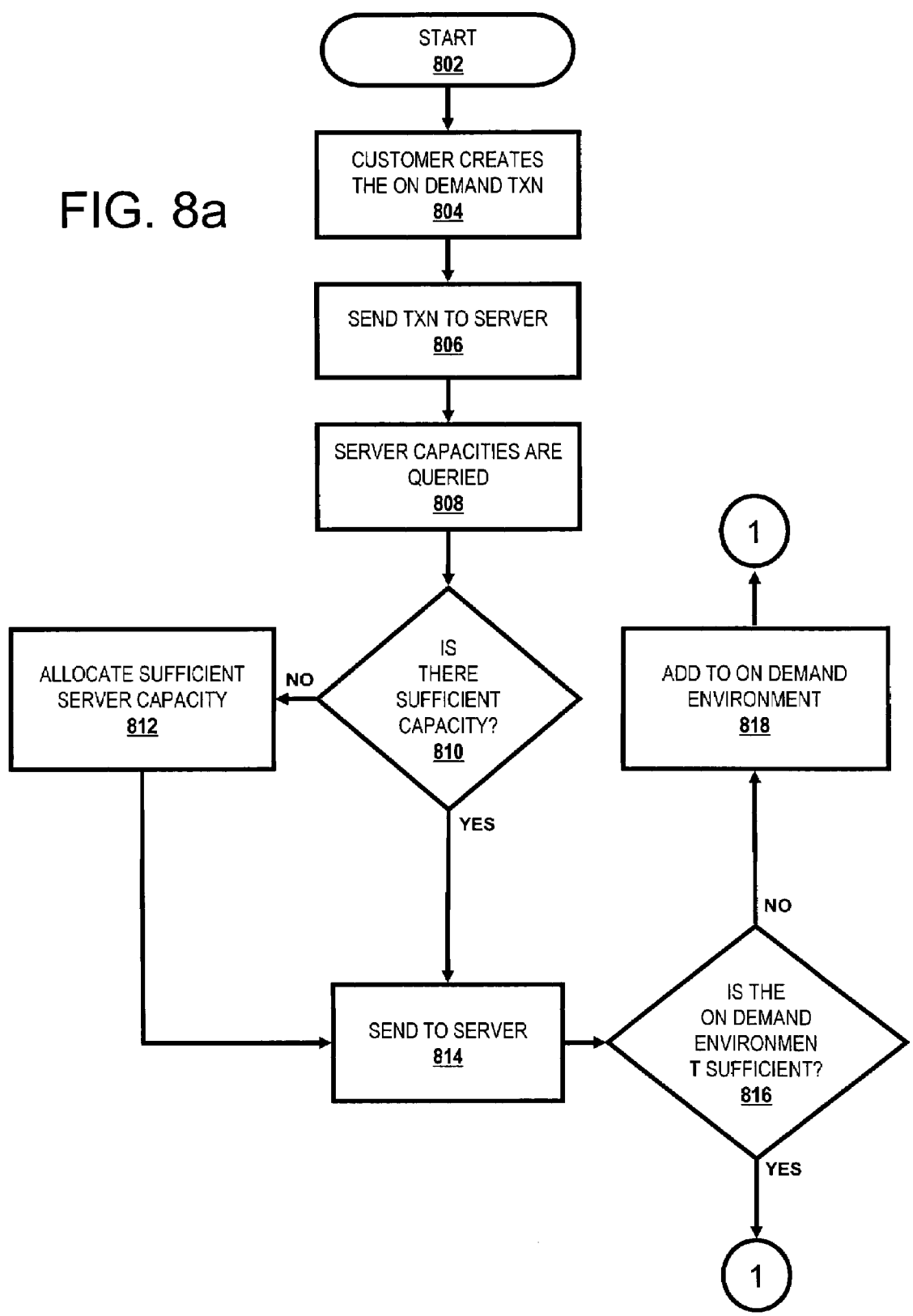
FIGS. 8a-b are flow-charts showing steps taken to execute the steps shown in FIGS. 1a-2 using an on-demand service provider.
Figure 8B:
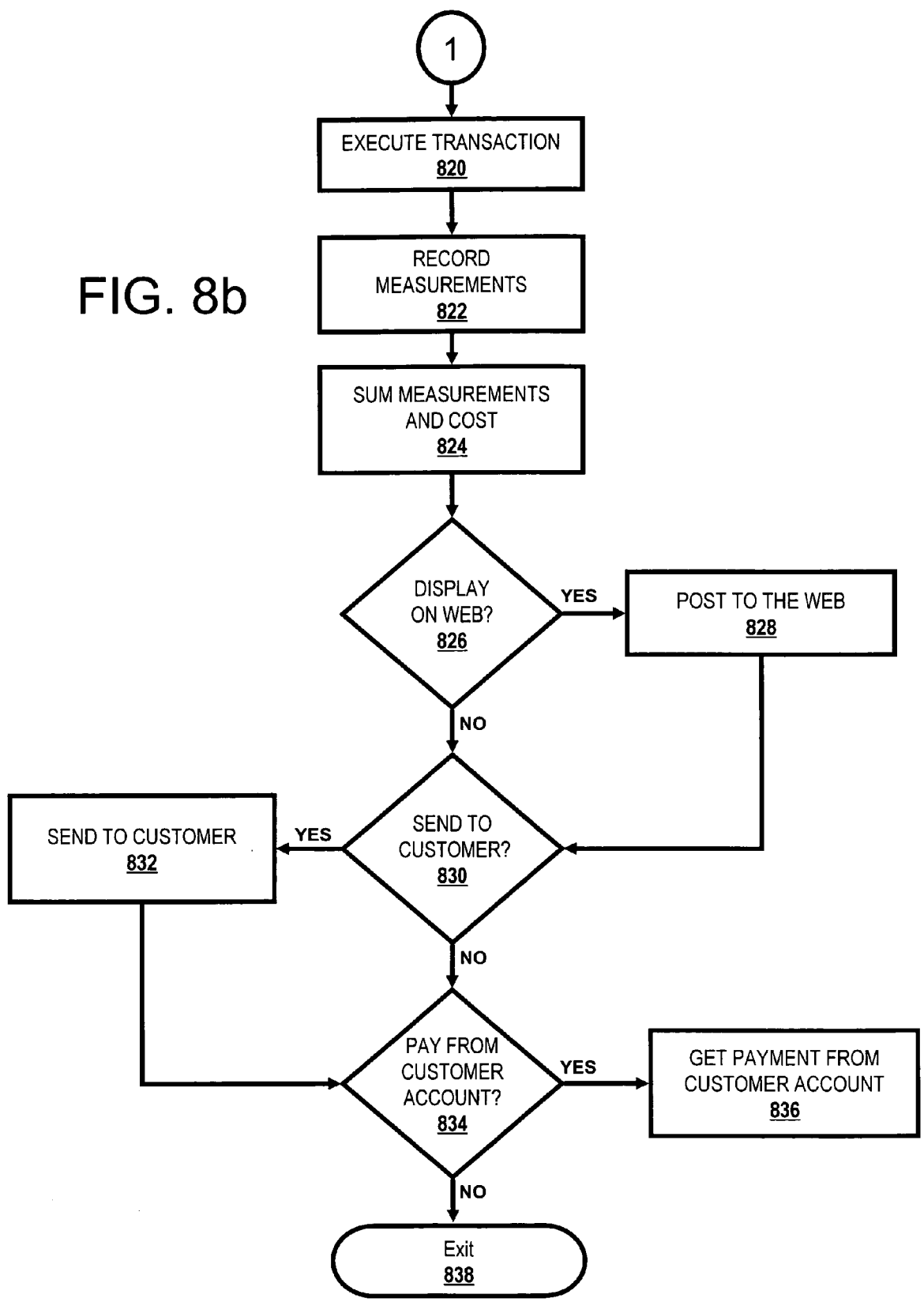

With reference now to FIGS. 8a-b, initiator block 802 begins the On Demand process. A transaction is created than contains the unique customer identification, the requested service type and any service parameters that further, specify the type of service (block 804). The transaction is then sent to the main server (block 806). In an On Demand environment the main server can initially be the only server, then as capacity is consumed other servers are added to the On Demand environment.

The server central processing unit (CPU) capacities in the On Demand environment are queried (block 808). The CPU requirement of the transaction is estimated, then the servers available CPU capacity in the On Demand environment are compared to the transaction CPU requirement to see if there is sufficient CPU available capacity in any server to process the transaction (query block 810). If there is not sufficient server CPU available capacity, then additional server CPU capacity is allocated to process the transaction (block 812). If there was already sufficient available CPU capacity then the transaction is sent to a selected server (block 814).

Before executing the transaction, a check is made of the remaining On Demand environment to determine if the environment has sufficient available capacity for processing the transaction. This environment capacity consists of such things as but not limited to network bandwidth, processor memory, storage etc. (block 816). If there is not sufficient available capacity, then capacity will be added to the On Demand environment (block 818). Next the required software to process the transaction is accessed, loaded into memory, then the transaction is executed (block 820).

The usage measurements are recorded (block 822). The usage measurements consist of the portions of those functions in the On Demand environment that are used to process the transaction. The usage of such functions as, but not limited to, network bandwidth, processor memory, storage and CPU cycles are what is recorded. The usage measurements are summed, multiplied by unit costs and then recorded as a charge to the requesting customer (block 824).

If the customer has requested that the On Demand costs be posted to a web site (query block 826), then they are posted (block 828). If the customer has requested that the On Demand costs be sent via e-mail to a customer address (query block 830), then these costs are sent to the customer (block 832). If the customer has requested that the On Demand costs be paid directly from a customer account (query block 834), then payment is received directly from the customer account (block 836). The On Demand process is then exited at terminator block 838.

Method Invoking Rules

The methods described herein may be invoked by one or more rules. These rules may be specific for a resource, a network, an enterprise, or any other resource partition at any granularity. The rule can optionally be initiated by a policy. Resources are defined to include hardware as well as software resources.

Figure 9A:
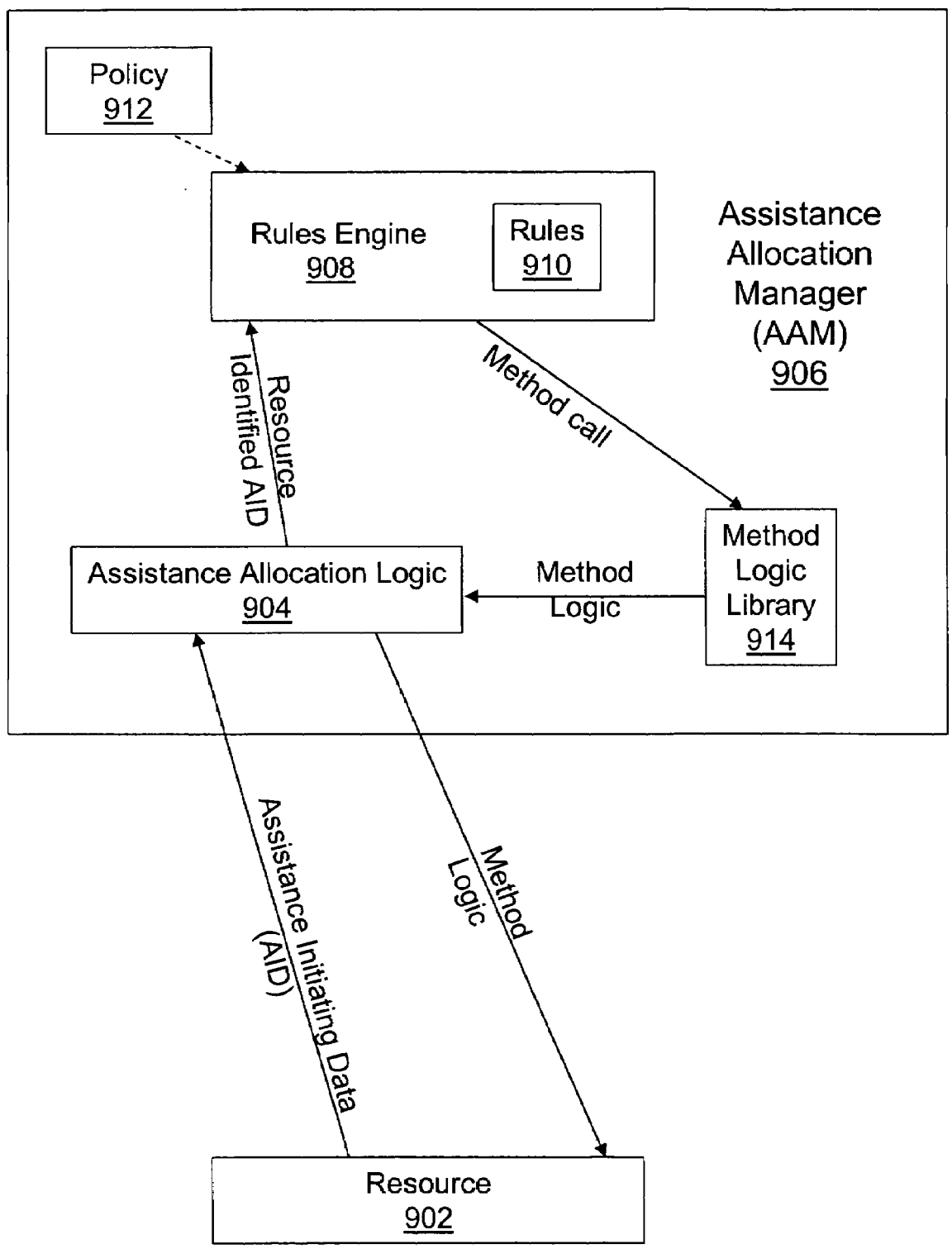
FIGS. 9a-b illustrate a process for utilizing one or more rules to invoke the methods described by the present invention, including but not limited to the steps described in FIGS. 1a-2.

For example, consider the infrastructure and process shown in FIG. 9a. A resource 902, such as client computer 302 or a service provider server 402, sends an Assistance Initiating Data (AID) to an Assistance Allocation Logic (AAL) 904 in an Assistance Allocation Manager (AAM). The AID may be a request for another resource, such as a particular Webpage, portal resource (including portlets, etc.), control instructions, etc. The AID may also be performance data that is pushed or pulled from the resource 902. For example, resource 902 may issue an AID requesting delivery of web content, execution of a server-based application, access to a particular website or a particular software resource, including an application, a method/class, a portlet, etc. Alternatively, the AID may be performance data, such as data that describes CPU usage, clock speed, hardware temperature, the number of users (actual or allocated) of the resource, etc. Such examples of types of AID are exemplary only, and are not to limit the scope of the definition of an AID.

When AAL 904 receives an AID, AAL 904 recognizes the type of AID and the identifier for the resource that sent the AID. The AID may directly contain a type indicator (indicating that the AID is for a request for resource(s), performance data, etc.) as well as an identifier for the AID-sending resource, or the AID may be linked to metadata that supplies such information. This information (the AID plus the identifier for the specific resource 902 that sent the AID) is forwarded from the AAL 904 to a rules engine 908, which includes a library of rules 910. Note that the rules 910 may be initiated by and responsive to a policy 912. Policy 912 may be formulated by a person or software logic associated with AAM 906, the resource 902, or any other entity having authority to influence the formulation of the rules 910.

Rules engine 908, by executing a particular rule 910 for the resource-associated AID, issues a message to a method logic library 914. This message instructs the method logic library 914 to access a particular method logic-which implements in software, hardware, or a combination thereof, a novel method as described above in the foregoing figures. The ALL 904 forwards this method logic to the resource 902, which implements the inventive and novel method under the control of the particular rule from the library of rules 910.

Figure 9B:
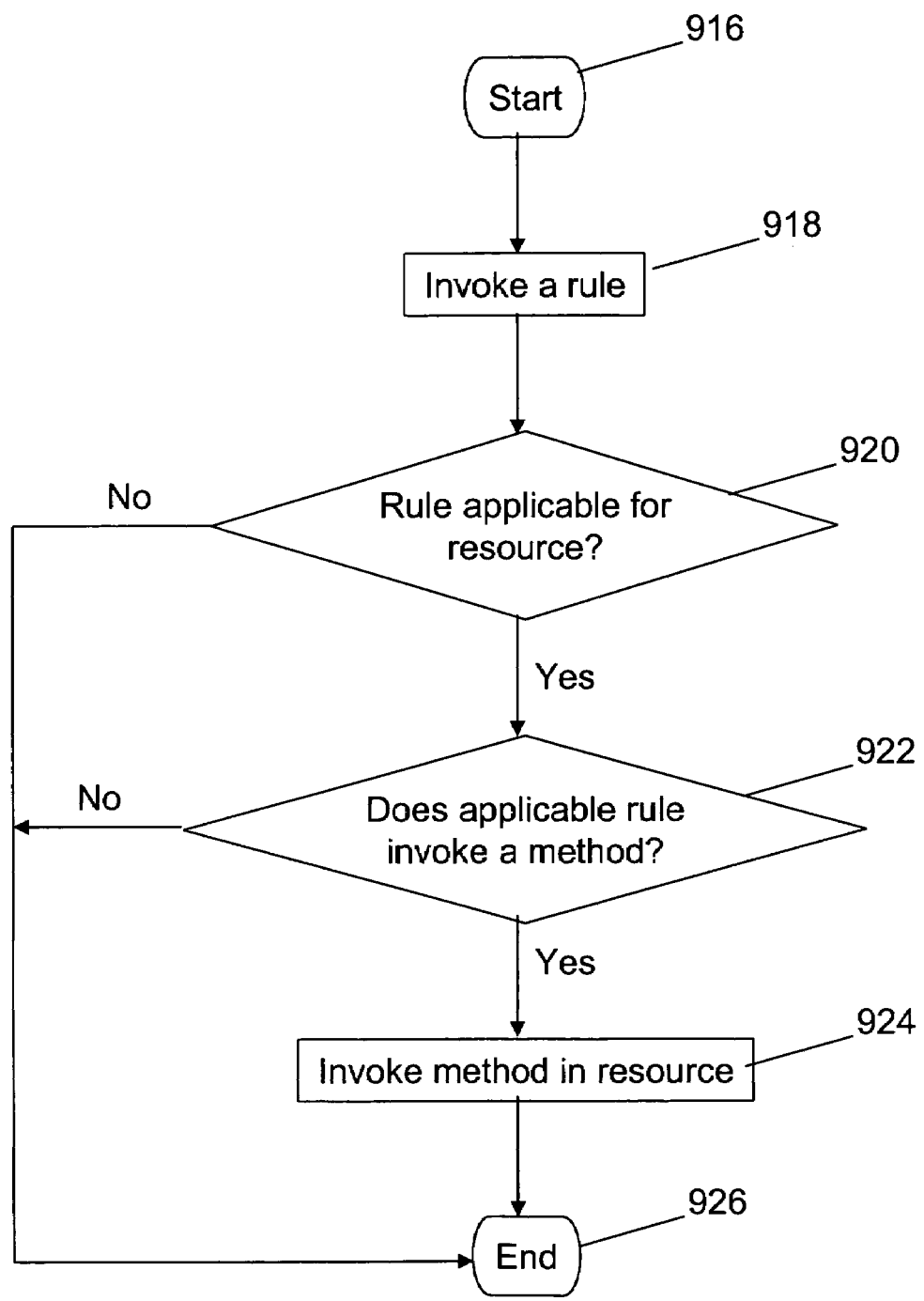

With reference now to FIG. 9b, a flow-chart of exemplary steps taken to invoke a method by a rule is presented. After initiator block 916, a rule is invoked (block 918). This rule may be invoked in response to a message from a resource, or the rule may be invoked autonomously by an Assistance Allocation Manager (AAM). The AAM may be a web-based service, such as that offered by IBM® Global Services® (IGS™), using a Service Oriented Architecture (SOA) software service such as IBM's Websphere®. The SOA software includes a bottom level of applications (pieces of code that perform some useful function), a middle level of Web services (infrastructure for accessing the applications), and a top layer of business processes (steps taken to call the Web services). Thus, in a preferred embodiment, the AAM is a third party service that manages resources for a customer.

Continuing with FIG. 9b, a query is made of the invoked rule to determine and/or confirm that the invoked rule is applicable to a particular resource (block 920). If so, then a determination is made regarding which method is called by the invoked rule (block 922). The appropriate method is then called and implemented in the appropriate resource (block 924), and the process ends (terminator block 926).

The present invention thus provides method, system and computer-readable medium for controlling access to a relational database. In one embodiment, the method comprises the steps of: defining and creating a plurality of entitlement tables, wherein the entitlement tables are usable by multiple relational databases; receiving a request, from a user, for access to requested data in a relational database, wherein the user is identified by a user identifier that is set by a relational database program; and determining if the user is authorized to access the requested data by comparing the user identifier with an entry in an entitlement table that is associated with the requested data in the relational database, wherein the entitlement table defines which data classifications are authorized to be accessed by the user. This method provides a practical application that is useful, concrete and tangible since multiple disparate databases (including those found in the program DB2) can now, through the use of the present invention, have entitlement controlled by a single entitlement table object. In one embodiment, the plurality of entitlement tables have a priority hierarchy, wherein the priority hierarchy defines a higher priority entitlement table as being dominant to, and therefore overrides, a lower priority entitlement table. The method may further include the step of, in response to determining an existence of a higher priority entitlement table that overrides a lower priority entitlement table, controlling access to the requested data according to entitlement criteria for the user identifier found in the higher priority entitlement table. This user identifier may be extracted from a header in the request for the requested data, wherein the SQL identifier was created by the DB2 relational database program for the user when the user logged into the DB2 relational database program. In one embodiment, at least one of the plurality of entitlement tables includes only rules for inclusion that permit a user with a specific user identifier to access the requested data, and wherein at least one of the plurality of entitlement tables includes only rules for exclusion that prohibit a user from accessing the requested data. Note also, that in one embodiment, access to requested data is limited to a single row of data in a relational database. In another embodiment, the method may further include the steps of: receiving, by an Assistance Allocation Manager (AAM), an Assistance Initiating Data (AID) from a resource in a data processing system; and in response to receiving the AID, executing a rule, in the AAM, that is specific for the AID and the resource that sent the AID, wherein executing the rule in the AAM causes the steps described herein to be executed for the resource that sent the AID.

While the present invention has been particularly shown and described with reference to a preferred embodiment, it will be understood by those skilled in the art that various changes in form and detail may be made therein without departing from the spirit and scope of the invention. For example, while user identification have been described as SQLID's, any user identification that is compatible with the system and process described may be used to identify a particular user. Furthermore, as used in the specification and the appended claims, the term "computer" or "system" or "computer system" or "computing device" includes any data processing system including, but not limited to, personal computers, servers, workstations, network computers, main frame computers, routers, switches, Personal Digital Assistants (PDA's), telephones, and any other system capable of processing, transmitting, receiving, capturing and/or storing data.

What is claimed is:

1. A method for controlling access to a relational database of a plurality of relational databases, the method comprising:
defining and creating a plurality of entitlement tables including a first entitlement table and a second entitlement table, wherein the first entitlement table and the second entitlement table are independent from each other, and wherein the first entitlement table defines a first set of rules for access to a first one or more relational databases of the plurality of relational databases and the second entitlement table defines a second set of rules for access to a second one or more relational databases of the plurality of relational databases;
establishing, for the relational database, a priority hierarchy between the first entitlement table and the second entitlement table such that the first entitlement table is dominant to, and therefore overrides, the second entitlement table;
receiving a program call for access to requested data in the relational database, wherein the request includes a user identifier that identifies a user, and wherein the user identifier is set by a relational database program;
in response to receiving the program call, determining if the user identifier has authorization to access the requested data by comparing the user identifier with an entry in the first entitlement table or the second entitlement table that is associated with the requested data in the relational database, wherein the first entitlement table or the second entitlement table defines which data classifications are authorized to be accessed by the user; and
in response to determining the user identifier has authorization to access the requested data, allowing access to the requested data;
wherein one of the first entitlement table and the second entitlement table includes only rules for inclusion that permit a user with a specific user identifier to access the requested data and another one of the first entitlement table and the second entitlement table includes only rules for exclusion that prohibit a user with a specific user identifier from accessing the requested data.

2. The method of claim 1, further comprising:
in response to determining that the first entitlement table overrides the second entitlement table, controlling access to the requested data according to entitlement criteria for the user identifier found in the first entitlement table.

3. The method of claim 1, wherein:
the relational database program is DB2; and
wherein the user identifier is a Structured Query Language (SQL) identifier that is in a header in the request for the requested data, wherein the SQL identifier was created by the DB2 relational database program for the user when the user logged into the DB2 relational database program.

4. The method of claim 1, wherein access to requested data is limited to a single row of data in a relational database.

5. The method of claim 1, further comprising:
receiving, by an Assistance Allocation Manager (AAM), an Assistance Initiating Data (AID) from a resource in a data processing system; and
in response to receiving the AID, executing a rule, in the AAM, that is specific for the AID and the resource that sent the AID, wherein executing the rule in the AAM causes the steps described in claim 1 to be executed for the resource that sent the AID.

6. The method of claim 1, wherein the one of the first entitlement table and the second entitlement table that includes only rules for inclusion enables access by the user to only one particular column of one or more columns of a single row.

7. The method of claim 1, wherein the first entitlement table is a hierarchical table within a first hierarchy and the second entitlement table is a hierarchical table within a second hierarchy, wherein each hierarchy includes a plurality of other entitlement tables comprising one or more inclusion entitlement tables that provide one or more other rules for inclusion for the user and one or more exclusion entitlement tables that provide one or more other rules for exclusion for the user.

8. The method of claim 1, wherein each entitlement table within the priority of entitlement tables has a defined priority level and provides a specific granularity level of access to the requested data in the relational database.

9. A system comprising:
a processor;
a data bus coupled to the processor;
a memory coupled to the data bus; and
a computer writeable storage medium storing computer program code, the computer program code comprising instructions executable by the processor and configured to:
define and create a plurality of entitlement tables including a first entitlement table and a second entitlement table, wherein the first entitlement table and the second entitlement table are independent from each other, wherein each entitlement table within the priority of entitlement tables has a defined priority level, and wherein the first entitlement table defines a first set of rules for access to a first one or more relational databases of a plurality of relational databases and the second entitlement table defines a second set of rules for access to a second one or more relational databases of the plurality of relational databases;
establish, for a relational database of the plurality of relational databases, a priority hierarchy between the first entitlement table and the second entitlement table such that the first entitlement table is dominant to, and therefore overrides, the second entitlement table;
receive a program call for access to requested data in the relational database, wherein the request includes a user identifier that identifies a user, and wherein the user identifier is set by a relational database program;
in response to receiving the program call, determine if the user identifier has authorization to access the requested data by comparing the user identifier with an entry in the first entitlement table or the second entitlement table that is associated with the requested data in the relational database, wherein the first entitlement table or the second entitlement table defines which data classifications are authorized to be accessed by the user; and
in response to determining the user identifier has authorization to access the requested data, allowing access to the requested data wherein one of the first entitlement table and the second entitlement table includes only rules for inclusion that permit a user with a specific user identifier to access the requested data and another one of the first entitlement table and the second entitlement table includes only rules for exclusion that prohibit a user with a specific user identifier from accessing the requested data, and wherein each entitlement table within the priority of entitlement tables has a defined priority level and provides a specific granularity level of access to the requested data in the relational database.

10. The system of claim 9, wherein the one of the first entitlement table and the second entitlement table that includes only rules for inclusion enables access by the user to only one particular column of one or more columns of a single row.

11. The system of claim 9, wherein the first entitlement table is a hierarchical table within a first hierarchy and the second entitlement table is a hierarchical table within a second hierarchy, wherein each hierarchy includes a plurality of other entitlement tables comprising one or more inclusion entitlement tables that provide one or more other rules for inclusion for the user and one or more exclusion entitlement tables that provide one or more other rules for exclusion for the user.

12. A computer writeable storage device storing computer program code for controlling access to a relational database of a plurality of relational databases, the computer program code comprising computer executable instructions configured for:
defining and creating a plurality of entitlement tables including a first entitlement table and a second entitlement table, wherein the first entitlement table and the second entitlement table are independent from each other, and wherein the first entitlement table defines a first set of rules for access to a first one or more relational databases of the plurality of relational databases and the second entitlement table defines a second set of rules for access to a second one or more relational databases of the plurality of relational databases;
establishing, for the relational database, a priority hierarchy between the first entitlement table and the second entitlement table such that the first entitlement table is dominant to, and therefore overrides, the second entitlement table;
receiving a program call for access to requested data in the relational database, wherein the request includes a user identifier that identifies a user, and wherein the user identifier is set by a relational database program;

in response to receiving the program call, determining if the user identifier has authorization to access the requested data by comparing the user identifier with an entry in the first entitlement table or the second entitlement table that is associated with the requested data in the relational database, wherein the first entitlement table or the second entitlement table defines which data classifications are authorized to be accessed by the user; and in response to determining the user identifier has authorization to access the requested data, allowing access to the requested data wherein one of the first entitlement table and the second entitlement table includes only rules for inclusion that permit a user with a specific user identifier to access the requested data and another one of the first entitlement table and the second entitlement table includes only rules for exclusion that prohibit a user with a specific user identifier from accessing the requested data, and wherein each entitlement table within the priority of entitlement tables has a defined priority level and provides a specific granularity level of access to the requested data in the relational database.

13. The computer writable storage device of claim 12, wherein the computer executable instructions are further configured for:
   in response to determining that the first entitlement table overrides the second entitlement table, controlling access to the requested data according to entitlement criteria for the user identifier found in the first entitlement table.

14. The computer writable storage device of claim 12, wherein:
   the relational database program is DB2; and
   the user identifier is a Structured Query Language (SQL) identifier that is in a header in the request for the requested data, wherein the SQL identifier was created by the DB2 relational database program for the user when the user logged into the DB2 relational database program.

15. The computer writable storage device of claim 12, wherein access to requested data is limited to a single row of data in a relational database.

16. The computer writable storage device of claim 12, wherein the computer executable instructions are further configured for:
   receiving, by an Assistance Allocation Manager (AAM), an Assistance Initiating Data (AID) from a resource in a data processing system; and
   in response to receiving the AID, executing a rule, in the AAM, that is specific for the AID and the resource that sent the AID, wherein executing the rule in the AAM causes the steps described in claim 1 to be executed for the resource that sent the AID.

17. The computer writable storage device of claim 12, wherein the computer executable instructions are deployable to a client computer from a download server that is at a remote location.

18. The computer writable storage device of claim 12, wherein the computer executable instructions are provided by a download service provider to a client computer on an on-demand basis.

19. The computer writable storage device of claim 12, wherein the one of the first entitlement table and the second entitlement table that includes only rules for inclusion enables access by the user to only one particular column of one or more columns of a single row.

20. The computer writable storage device of claim 12, wherein the first entitlement table is a hierarchical table within a first hierarchy and the second entitlement table is a hierarchical table within a second hierarchy, wherein each hierarchy includes a plurality of other entitlement tables comprising one or more inclusion entitlement tables that provide one or more other rules for inclusion for the user and one or more exclusion entitlement tables that provide one or more other rules for exclusion for the user.

* * * * *